Patented Aug. 31, 1926.

1,598,169

UNITED STATES PATENT OFFICE.

FRITZ STRAUB, OF BASEL, SWITZERLAND, ASSIGNOR TO SOCIETY OF CHEMICAL INDUSTRY IN BASLE, OF BASEL, SWITZERLAND.

DYESTUFFS CONTAINING CHROMIUM AND PROCESS OF MAKING THE SAME.

No Drawing.    Application filed August 3, 1925. Serial No. 47,972.

The present invention relates to new dyestuffs containing chromium valuable for the production of fast tints on the fibre. It comprises the new dyestuffs, the process of making same, and the material dyed and printed with the new dyestuffs.

It has been found, that the dyestuffs which may be obtained from 3-aminonaphthalene-1:8-dicarboxylic acid (by coupling with diazo compounds, or by diazotization and coupling with coupling components) may be converted into new azo-dyestuffs containing chromium by treatment with agents yielding chromium, such as the salts, oxides and hydroxides of the trivalent chromium. The new dyestuffs, in which the manner whereby the chromium is bound to the azo-dyestuff complex is not known, may be considered as the complex chromium compounds of the azo-dyestuffs derived from 3-aminonaphthalene-1:8-dicarboxylic acid, the general formula of which being characterized by the presence of a 1:8-naphthalic acid complex

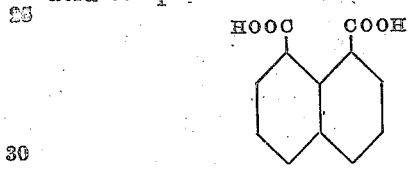

not containing any hydroxyl groups.

The new dyestuffs form brownish-red to blackish powders, dissolving in water with yellow to orange, violet-red and green coloration, in dilute caustic soda solution with yellow to orange, brown, Bordeaux and green coloration, yielding, when dyed on wool from an acid bath, yellow to orange, violet and green tints. Owing to the presence of the carboxylic groups, the new products may be employed also for calico printing. When printed on cotton, preferably in presenec of a chromium mordant, they yield very fast yellow to orange, violet and green shades.

Example 1.

47.6 parts of the azo-dyestuff from diazotized 6-nitro-2-amino-1-phenol-4-sulfonic acid and 3-aminonaphthalene-1:8-dicarboxylic acid are dissolved in 950 parts of boiling water, treated with a solution of chromium formate corresponding with 22.6 parts of $Cr_2O_3$, and boiled for some time in a reflux apparatus. The chromium compound is then isolated by addition of common salt. It forms a blackish powder, dissolving in water and in caustic soda solution of 10 per cent strength with greenish, and in concentrated sulfuric acid with reddish-brown coloration. When printed on cotton, preferably in presence of chromium acetate, as well as dyed on wool from a sulfuric acid bath, it yields green, very fast shades.

The new dyestuff is to be considered as a complex chromium compound of the azo-dyestuff corresponding with the following formula:

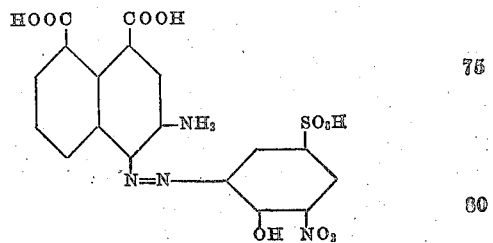

Example 2.

47.6 parts of the azo-dyestuff from diazotized 4-nitro-2-amino-1-phenol-6-sulfonic acid and 3-aminonaphthalene-1:8-dicarboxylic are dissolved in 950 parts of boiling water, treated with a solution of chromium fluoride corresponding with 22.6 parts of $Cr_2O_3$, and boiled for some time in presence of glass powder in a reflux apparatus. The chromium compound thus obtained is filtered and washed, dissolved in tepid, dilute aqueous caustic soda solution, and isolated in the usual manner after neutralization of the solution with acetic acid.

The new dyestuff forms in a dry state a blackish powder, dissolving in water with green, in caustic soda solution of 10 per cent strength with bluish-green, in concentrated sulfuric acid with yellowish-brown coloration. When printed on cotton, preferably in presence of chromium acetate, as well as dyed on wool in a sulfuric acid bath, it yields very fast green tints.

Example 3.

52.6 parts of the azo-dyestuff from diazotized 2-amino-1-phenol-4-sulfonic-6-carboxylic acid and 3-amino-naphthalene-1:8-dicarboxylic acid are dissolved in 1000 parts of boiling water, treated with a chromium fluoride solution corresponding with 22.8 parts of $Cr_2O_3$, and boiled for some time in presence of glass powder in a reflux apparatus. The solution of the dyestuff containing chormium is then concentrated by evaporation and the dyestuff isolated in the usual manner. It forms a blackish powder, dissolving in water with bluish-green coloration, in caustic soda solution of 10 per cent strength with greenish-blue, in concentrated sulfuric acid with brown-Bordeaux coloration. When printed on cotton in presence of chromium acetate, as well as dyed on wool from a sulfuric acid bath, it yields very fast bluish-green tints.

Example 4.

53.3 parts of the dyestuff from 1-amino-5-hydroxy-naphthalene-7-sulfonic acid and diazotized 3-aminonaphthalene-1:8-dicarboxylic acid are dissolved in 1500 parts of boiling water, treated with a solution of chromium acetate corresponding with 22.8 parts of $Cr_2O_3$, and boiled for some time in a reflux apparatus. The dyestuff containing chromium, which forms a fine suspension sparingly soluble in water, is filtered and washed with water and treated as indicated in the second example. It forms, in a dry state, a brownish-black powder, dissolving in water with violet-red, in caustic soda solution of 10 per cent strength with brownish-red, and in concentrated sulfuric acid with bluish-red coloration. When printed on cotton in presence of chromium acetate it yields very fast reddish-violet tints.

The new dyestuff is to be considered as the complex chromium compound of the dyestuff corresponding with the following formula:

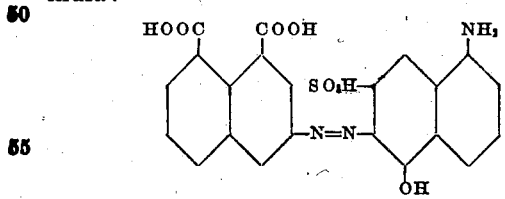

Example 5.

58.7 parts of the dyestuff from 2-hydroxynaphthalene-6-sulfonic acid and diazotized 3-aminonaphthalene-1:8-dicarboxylic acid are dissolved in 1500 parts of boiling water, treated with a chromium acetate solution corresponding with 22.8 parts of $Cr_2O_3$, and boiled for some time in a reflux apparatus. The dyestuff containing chromium is isolated as described in Example 2. It forms in a dry state a reddish-brown powder, dissolving in water with orange, in caustic soda solution of 10 per cent strength with yellowish-brown, and in concentrated sulfuric acid with bluish-red coloration. When dyed on wool from a sulfuric acid bath it yields orange tints. When printed on cotton in presence of chromium acetate it yields very fast orange tints.

Example 6.

58.8 parts of the azo-dyestuff from 1-hydroxy-naphthalene-4-sulfonic acid and diazotized 3-aminonaphthalene-1:8-dicarboxylic acid are dissolved in 1800 parts of boiling water, treated with a chromium acetate solution corresponding with 15.2 parts of $Cr_2O_3$, and boiled for some time in a reflux apparatus. The dyestuff containing chromium is isolated as indicated in example 2. It forms in a dry state a reddish-brown powder, dissolving in water with red, in caustic soda solution of 10 per cent strength with orange, in concentrated sulfuric acid with Bordeaux coloration. When dyed on wool from a sulfuric acid bath it yields red tints.

Yellow dyestuffs containing chromium may be obtained for instance from the azo-dyestuffs obtained from diazotized 3-aminonaphthalene-1:8-dicarboxylic acid and pyrazolones.

What I claim is:—

1. The herein described process for the manufacture of complex chromium compounds of azo-dyestuffs by treating the azo-dyestuffs derived from 3-aminonaphthalene-1:8-dicarboxylic acid, the general formula of which being characterized by the presence of a 1:8-naphthalic acid complex

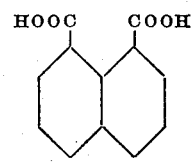

not containing any hydroxyl groups, with the oxides, hydroxides and salts of trivalent chromium.

2. The herein described process for the manufacture of complex chromium compounds of azo-dyestuffs by treating the azo-dyestuffs corresponding with the general formula:

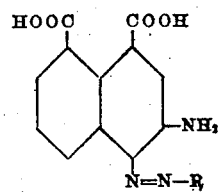

wherein R means an aromatic residue, with the oxides, hydroxides and salts of trivalent chromium.

3. The herein described process for the manufacture of complex chromium compounds of azo-dyestuffs by treating the azo-dyestuffs corresponding with the general formula:

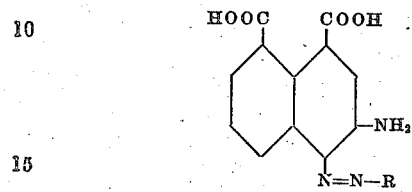

wherein R means an aromatic residue containing a hydroxyl group in ortho-position to the azo-bridge, with the oxides, hydroxides and salts of trivalent chromium.

4. As new products the herein described complex chromium compounds of the azo-dyestuffs derived from 3-aminonaphthalene-1:8-dicarboxylic acid, the general formula of which being characterized by the presence of a 1:8-naphthalic acid complex

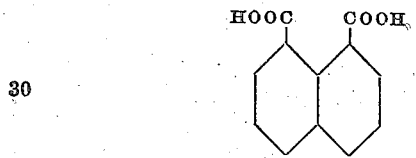

not carrying any hydroxyl groups, which dyestuffs form brownish-red to blackish powders, dissolving in water with yellow to orange, violet-red and green coloration, in dilute caustic soda solution with yellow to orange, brown, Bordeaux and green coloration, dyeing wool from an acid bath yellow to orange, violet and green tints, and yielding when printed on cotton very fast yellow to orange, violet and green shades.

5. As new products the herein described complex chromium compounds of the azo-dyestuffs corresponding with the general formula:

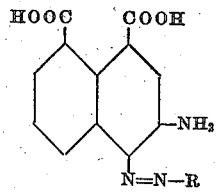

wherein R means an aromatic residue, which products form blackish powders, dissolving in water and in dilute caustic soda solution with green to bluish-green coloration, yielding on wool, when dyed from an acid bath, or printed on cotton, fast green tints.

6. As new products the herein described complex chromium compounds of the azo-dyestuffs corresponding with the general formula:

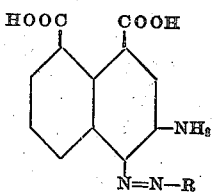

wherein R means an aromatic residue carrying a hydroxyl group in ortho-position to the azo-bridge, which products form blackish powders, dissolving in water and in dilute caustic soda solution with green to bluish-green coloration, yielding on wool, when dyed from an acid bath, or printed on cotton, fast green tints.

7. The material dyed and printed with the dyestuffs of claim 4.

8. The material dyed and printed with the dyestuffs of claim 5.

9. The material dyed and printed with the dyestuffs of claim 6.

In witness whereof I have hereunto signed my name this 15th day of July, 1925.

FRITZ STRAUB.